United States Patent
Lewis

(10) Patent No.: US 9,796,519 B2
(45) Date of Patent: Oct. 24, 2017

(54) CARROUSEL STYLE TRANSMISSION VALVE BODY COMPONENT SHIPPING AND ASSEMBLY CARTRIDGE

(71) Applicant: GM Global Technology Operations LLC, Detroit, MI (US)

(72) Inventor: Neal A. Lewis, Dearborn Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 392 days.

(21) Appl. No.: 14/463,917

(22) Filed: Aug. 20, 2014

(65) Prior Publication Data
US 2016/0052697 A1    Feb. 25, 2016

(51) Int. Cl.
*B23P 19/00* (2006.01)
*B65D 83/00* (2006.01)

(52) U.S. Cl.
CPC ........ *B65D 83/0033* (2013.01); *B23P 19/001* (2013.01); *Y10T 29/49826* (2015.01)

(58) Field of Classification Search
CPC .......... F41B 11/50; F41B 11/51; B65D 83/00; B65D 83/0016; B65D 2583/049; B25B 23/06; B25B 23/045; B25B 31/00; G07F 11/00; B25C 1/188; B25C 3/002; Y10T 29/49826
See application file for complete search history.

(56) References Cited

U.S. PATENT DOCUMENTS 6,824,011 B1 * 11/2004 Woempner .............. F41B 11/50
                                                      221/263
2007/0125824 A1 * 6/2007 Wojcicki ................ B25C 1/003
                                                      227/137

FOREIGN PATENT DOCUMENTS

CN       103313631 A     9/2013
KR    20100002752 A      1/2010

OTHER PUBLICATIONS

Chinese Office Action dated Feb. 27, 2017 ; Application No. 201510513155.X; Applicant: GM Global Technology Operations LLC.; 6 pages.

* cited by examiner

*Primary Examiner* — Sarang Afzali
*Assistant Examiner* — Ruth G Hidalgo-Hernandez
(74) *Attorney, Agent, or Firm* — BrooksGroup

(57) ABSTRACT

A number of variations may include a product comprising a carrousel cartridge loading device comprising: an indexing cam system; a spring-loaded trigger, wherein the spring-loaded trigger is attached to the indexing cam system; a handle, wherein the handle is attached to the indexing cam system; a barrel, wherein the barrel is operatively connected to the indexing cam system; and at least one carrousel cartridge holder, wherein the at least one carrousel cartridge holder is attached to the indexing cam system.

12 Claims, 4 Drawing Sheets

CARROUSEL STYLE TRANSMISSION VALVE BODY COMPONENT SHIPPING AND ASSEMBLY CARTRIDGE

TECHNICAL FIELD

The field to which the disclosure generally relates to includes shipping and assembly devices for components.

BACKGROUND

Shipping and assembly devices may be used for any number of components.

SUMMARY OF ILLUSTRATIVE VARIATIONS

One variation may include a product comprising a carrousel cartridge loading device comprising: an indexing cam system; a spring-loaded trigger, wherein the spring-loaded trigger is attached to the indexing cam system; a handle, wherein the handle is attached to the indexing cam system; a barrel, wherein the barrel is operatively connected to the indexing cam system; and at least one carrousel cartridge holder, wherein the at least one carrousel cartridge holder is attached to the indexing cam system.

Another variation may include a method comprising shipping and assembly of vehicle components comprising: providing at least one carrousel cartridge to hold at least one component; placing the at least one component into the at least one carrousel cartridge and closing the at least one carrousel cartridge sealing the at least one component inside; placing the at least one carrousel cartridge into a carrousel cartridge loading device; lining up the carrousel cartridge loading device with a vehicle assembly; and activating the carrousel cartridge loading device to drop the at least one component onto a vehicle assembly.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
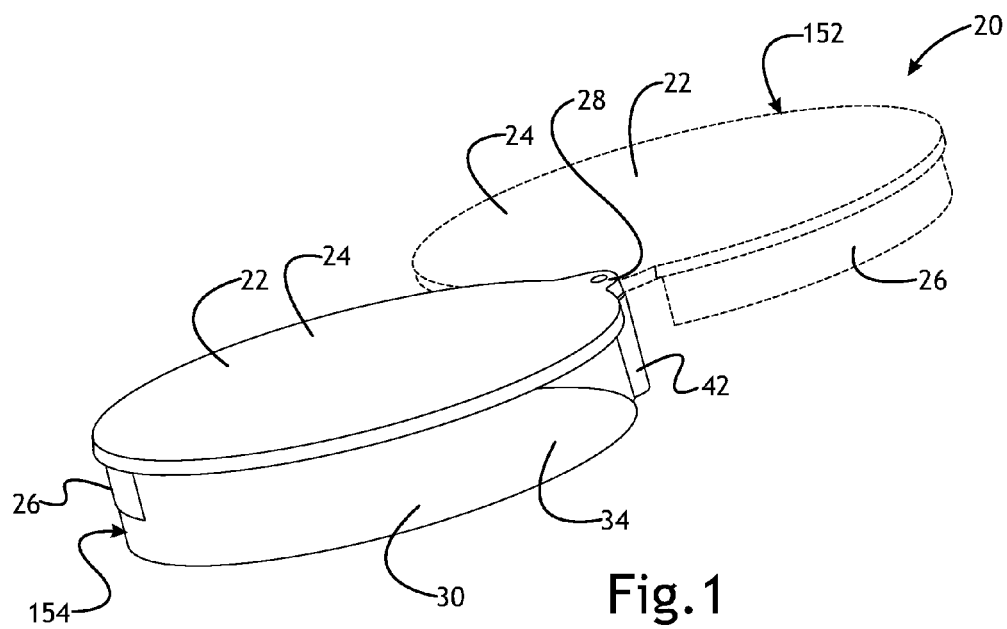
FIG. 1 illustrates a perspective view of a carrousel cartridge in an open position and a closed position according to a number of variations.
Figure 2:
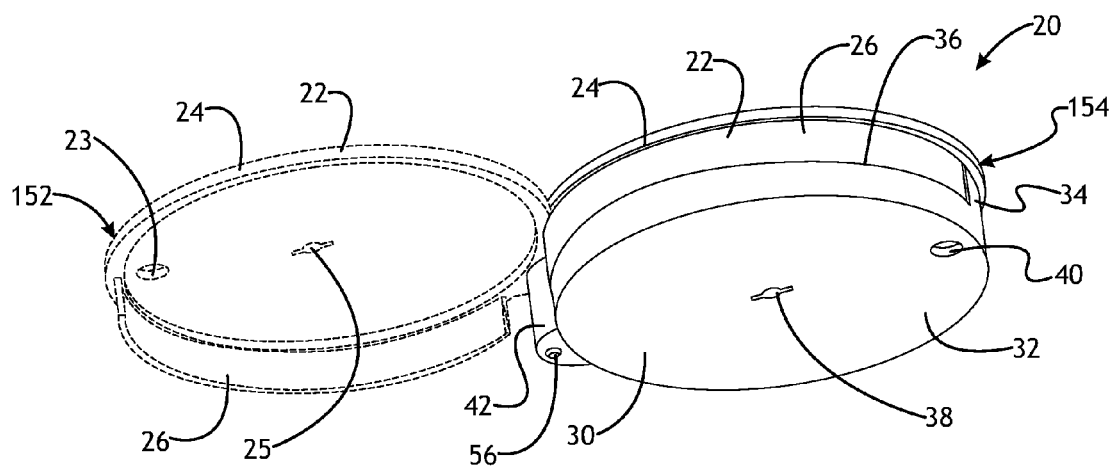
FIG. 2 illustrates a perspective view of a carrousel cartridge in an open position and a closed position according to a number of variations.
Figure 3:
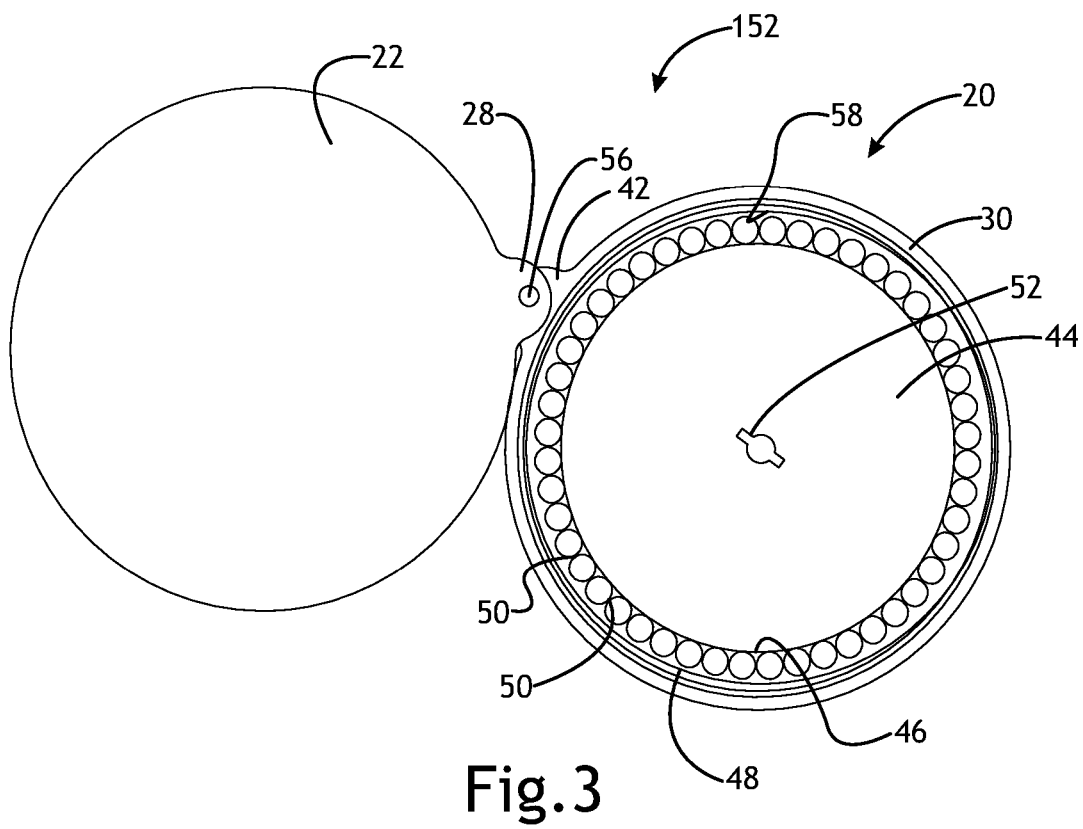
FIG. 3 illustrates a top view of a carrousel cartridge in an open position according to a number of variations.
Figure 6:
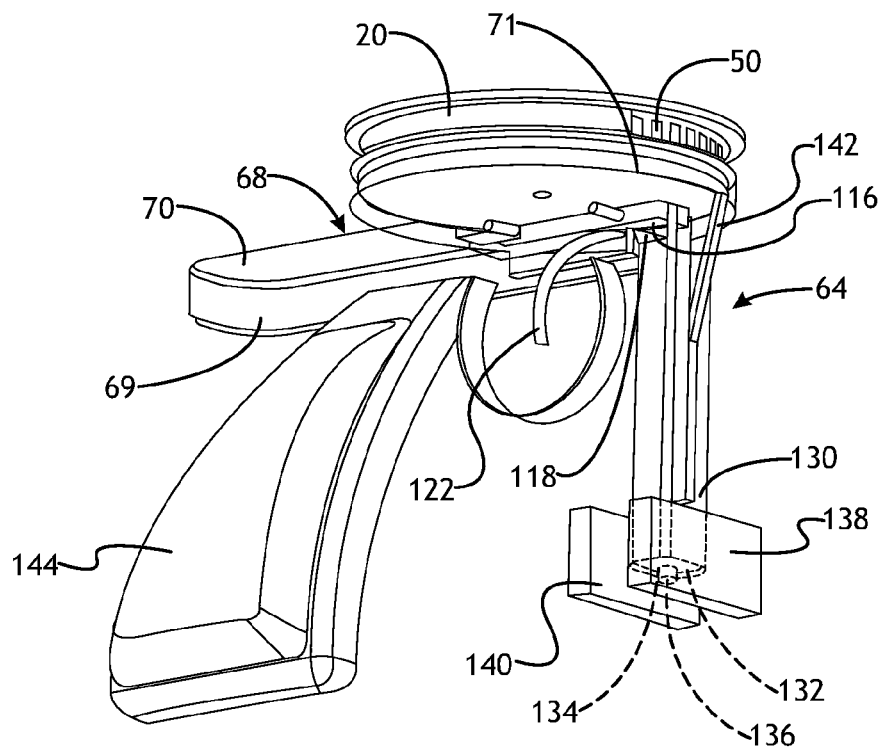
FIG. 6 illustrates a perspective view of a carrousel cartridge loading device according to a number of variations.
Figure 7:
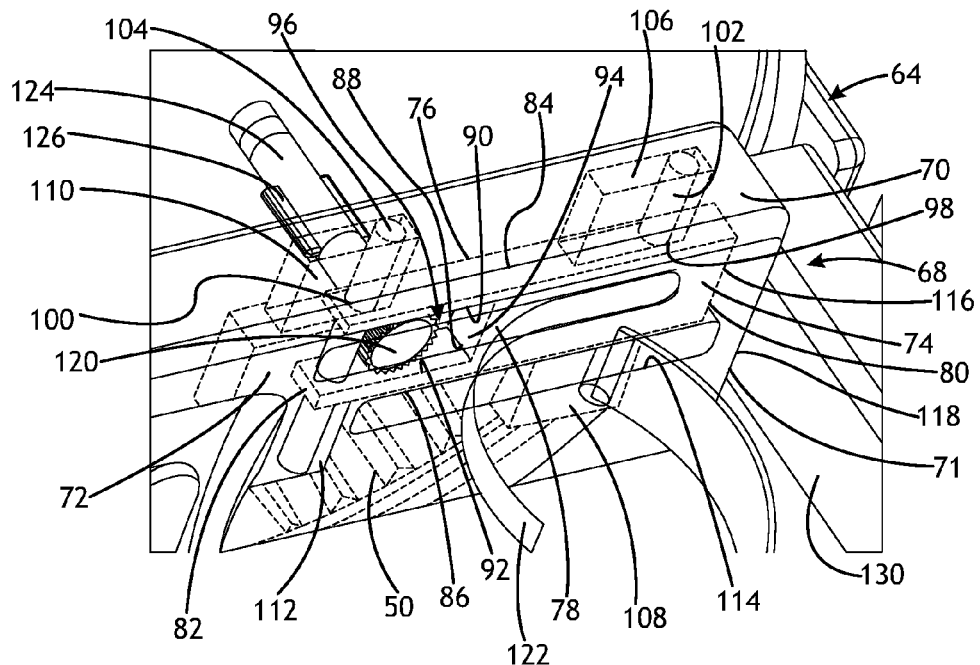
FIG. 7 illustrates a close-up bottom perspective view of a indexing cam system according to a number of variations.

FIGS. 1-3 illustrate a number of variations. In one variation, a carrousel cartridge 20 may include a top compartment 22 and a bottom compartment 30. In a number of variations, the bottom compartment 30 may be constructed and arranged to house one or more components 58, including, but not limited to, vehicle components such as transmission valve body springs, valves, and cap components. The bottom compartment 30 may be circular in shape and may include a bottom surface 32 and a wall 34 which may extend upward from the bottom surface 32. The wall 34 may include a cutout 36 along a portion of the wall 34 which may be constructed and arranged to accommodate a wall portion 26 on the top compartment 22 as will be discussed hereafter. An inner case 44 may be rotatably connected to the bottom surface 32, a variation of which is illustrated in FIG. 3. The inner case 44 may include a ring-shaped cutout or groove 46 adjacent the perimeter 48 of the inner case 44 which may be constructed and arranged to secure one or more components 58 in place in the bottom compartment 30 during shipping and/or assembly of the components 58. The cutout 46 may also include one or more protrusions 50 which may be spaced along the cutout 46 and which may further hold the one or more components 58 in place in the bottom compartment 30 and/or act as a divider between the components 58, variations of which are best illustrated in FIGS. 6 and 7. The one or more protrusions 50 may also assist in rotating the components 58 within the bottom compartment 30 when the carrousel cartridge 20 is activated. The bottom surface 32 and inner case 44 may also each include a keyhole 38, 52 which may be located approximately central of each of the bottom surface 32 and the inner case 44. The keyhole 38, 52 may be constructed and arranged to mate with any number of paddle devices 126 which may be attached to a vertical shaft 124 which may be used to turn the inner case 44, as will be discussed hereafter. The bottom surface 32 may also include an opening 40 which may allow a component 58 to drop from the carrousel cartridge 20 when activated by a machine or operator as will be discussed hereafter.

In a number of variations, the top compartment 22 may comprise a top surface 24 which may include a wall portion 26 which may be constructed and arranged to mate with the bottom compartment 30 cutout 36, which may seal the carrousel cartridge 20 when the carrousel cartridge 20 is in a closed position, which may prevent any components 58 which may be inside the carrousel cartridge 20 from coming out of the carrousel cartridge 20 and may also prevent or reduce contaminants from entering into the carrousel cartridge 20. In a number of variations, the top compartment 22 may include a keyhole 25 which may be located approximately central of the top compartment 22, a variation of which is illustrated in FIG. 2, and which may be constructed and arranged to accommodate a paddle device 126 on the vertical shaft 124, as will be discussed hereafter. The top compartment 22 may also include an opening 23, a variation of which is also illustrated in FIG. 2, which may be constructed and arranged to allow one or more components 58 from a second, third, etc. carrousel cartridge 20 to drop through the subsequent carrousel cartridge(s) 20 and into the carrousel cartridge loading device 64. In another variation, the top compartment 22 may not include an opening 23 and/or a keyhole 25, variations of which are illustrated in FIGS. 1 and 3, such as when the carrousel cartridge 20 may be the single carrousel cartridge 20 used with the carrousel cartridge dispenser 20 or in a situation where the carrousel cartridge 20 is used as the top carrousel cartridge 20 where multiple carrousel cartridges 20 are used.

The top compartment 22 and the bottom compartment 30 may be rotatably attached to each other so that the carrousel cartridge 20 may be in an open position 152 (illustrated in phantom lines) or a closed position 154, variations of which are each illustrated in FIGS. 1 and 2. In one variation, the bottom compartment 30 may include a protrusion 42 which may extend vertically from the outer perimeter of the wall 34. The top compartment 22 may include a tab 28 which may extend from the perimeter of the top surface 24. The top compartment 22 and the bottom compartment 30 may then be rotatably secured together by a pin 56 which may extend through the tab 28 and the protrusion 42. The top compartment 22 and the bottom compartment 30 may then be opened 152 and closed 154 by sliding the top compartment 22 and bottom compartment 30 apart or together. In a number of variations, the carrousel cartridges 20 may provide proper orientation of the components 58. The carrousel cartridges 20 may also be reusable so that several shipments of components 58 may be made using the same carrousel cartridge 20.

Figure 4:
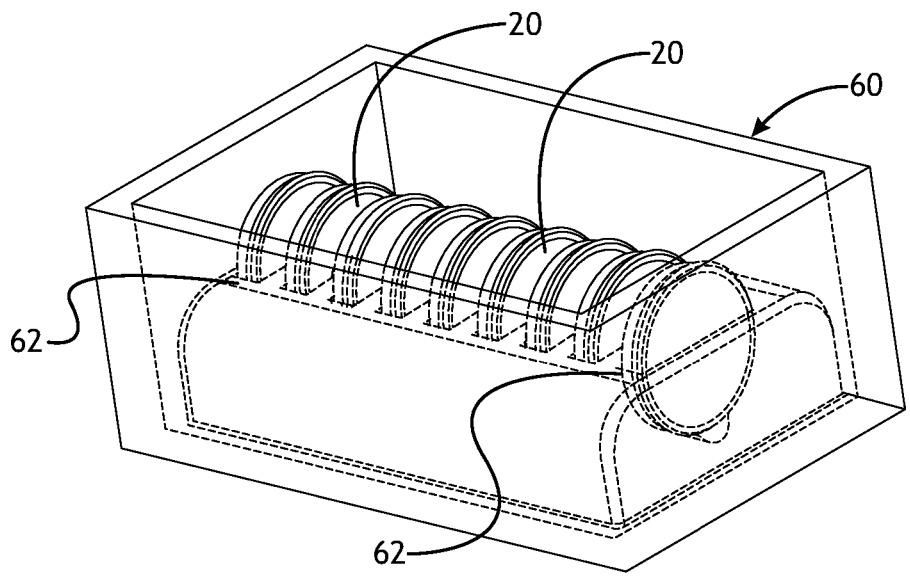
FIG. 4 illustrates a carrousel cartridge carrier according to a number of variations.

In a number of variations, one or more carrousel cartridges 20 may be shipped in a container or tote 60 having one or more carrousel cartridge compartments or pockets 62 which may allow the components 58 to be shipped and stored using reduced floor space. In one variation, the tote 60 may be a vacuum formed insert which may include a plurality of pockets 62 which may be constructed and arranged to hold one or more carrousel cartridges 20 in an upright position inside of the tote 60, a variation of which is illustrated in FIG. 4.

FIGS. 5-9 illustrate a number of variations. In one variation, a carrousel cartridge loading device 64 may be used to assist in the assembly of a vehicle system (or any number of other systems) including, but not limited to, the assembly of transmission valve bodies 66. The use of the carrousel cartridge loading device 64 may reduce or eliminate operator contact with the components 58. In a number of variations, a carrousel cartridge loading device 64 may comprise a handle 144, one or more carrousel cartridge holders 146, 148, an indexing cam system 68, a spring-loaded trigger 122, and a barrel 130. In a number of variations, the carrousel cartridge loading device 64 may be hand-held by an operator and ergonomically designed. In a number of variations, the carrousel cartridge loading device 64 may also be tethered to an assembly station.

In a number of variations, an indexing cam system 68 may include a housing 70, which may include a trap door slide channel 72 which may be located approximately central of the housing 70 and may be constructed and arranged to slideably house a trap door slide 74, a variation of which is illustrated in FIG. 7. The housing 70 may also include a first and second roller channel 106, 108 on opposing sides of the trap door slide channel 72 and may also include a third and fourth roller channel 110, 112 spaced a distance from the first and second roller channels 106, 108 and on opposing sides of the trap door slide channel 72. The first and second roller slide channel 106, 108 may be constructed and arranged to slideably house a first roller 102 and the third and fourth roller slide channel 110, 112 may be constructed and arranged to slideably house a second roller 104. The housing 70 may also include a horizontal cutout or opening 114 which may extend vertically downward through the trap door slide channel 72 approximately central of the trap door slide channel 72 which may be constructed and arranged to accommodate the trigger 122, as will be discussed hereafter. The housing 70 may also include an opening 116 in a front surface 118 of the housing 70 which may be constructed and arranged to accommodate at least a portion of the trap door slide 74 which may exit the housing 70 and enter the barrel 130, a variation of which is illustrated in FIG. 7.

In a number of variations, a trap door slide 74 may include a top surface 76, a bottom surface 78, a front surface 80, a rear surface 82, and a first and a second side surface 84, 86, a variation of which is illustrated in FIG. 7. An opening 88 may extend a distance inward from the rear surface 82 of the trap door slide 74 and may be constructed and arranged to accommodate a cam 120. The opening 88 may include a first and second side wall 90, 92 and a front wall 94. At least one of the first and/or second side walls 90, 92 may include a notch or protrusion 96 which may be constructed and arranged to mate with the cam 120 so that when the trigger 122 may be pulled, the notch or protrusion 96 may hold the cam 120 in a locked position once the trigger 122 is released, a variation of which is illustrated in FIG. 7. The trap door slide 74 may also include a first horizontal through-hole 98 which may be adjacent the front surface 80 and may be constructed and arranged to accommodate the first roller 102. The trap door slide 74 may also include a second horizontal through-hole 100 which may be constructed and arranged to accommodate the second roller 104. The trigger 122 may be attached to the bottom surface 78 of the trap door slide 74. Any number of trigger styles may be used. In a number of variations, the trap door slide 74 may sit in the trap door slide channel 72 in the indexing cam housing 70 so that the first roller 102 sits in the first and second roller channels 106, 108, the second roller 104 sits in the third and the fourth roller channels 110, 112, and at least a portion of the trigger 122 extends through the trap door channel opening 114, a variation of which is illustrated in FIG. 7. At least a portion of the front surface 80 of the trap door slide 74 may extend from out of the cam indexing housing 70 in a first position. In a number of variations, the trap door slide 74 may be operatively connected to a spring (not illustrated) so that the trigger 122 may be spring-loaded, so that when the trigger 122 is pulled the spring compresses causing the trap door slide 74 to move into a second position, and when the trigger 122 is released, the trap door slide 74 is returned to the first position from the force of the spring as the spring decompresses.

In a number of variations, the cam 120 may be operatively connected to a vertical shaft 124 which may include a paddle device 126 which may be constructed and arranged to mate with the keyholes 38, 52 on the bottom compartment 30 and the inner case 44. When the trigger 122 is pulled, the trap door slide 74 may be pulled from a first position to a second position which may expose the opening 40 from the bottom compartment 30 of the carrousel cartridge 20 so that one or more components 58 may be released from the carrousel cartridge 20 into the barrel 130. As the trigger 122 is pulled, the cam 120 may rotate the vertical shaft 124 which may rotate the paddle device 126 operatively connected to the inner case 44 which may rotate the inner case 44 indexing the one or more components 58 inside of the carrousel cartridge 20 and causing the components 58 to rotate so that at least one component 58 inside of the carrousel cartridge 20 may be systematically released from the carrousel cartridge 20 each time the trigger 122 is pulled. When the trigger 122 is released, the spring operatively attached to the trigger 122 may cause the trap door slide 74 to move back to the first position which may close the opening 40 from the carrousel cartridge 20 which may prevent any components 58 from releasing from the carrousel cartridge 20.

Figure 5:
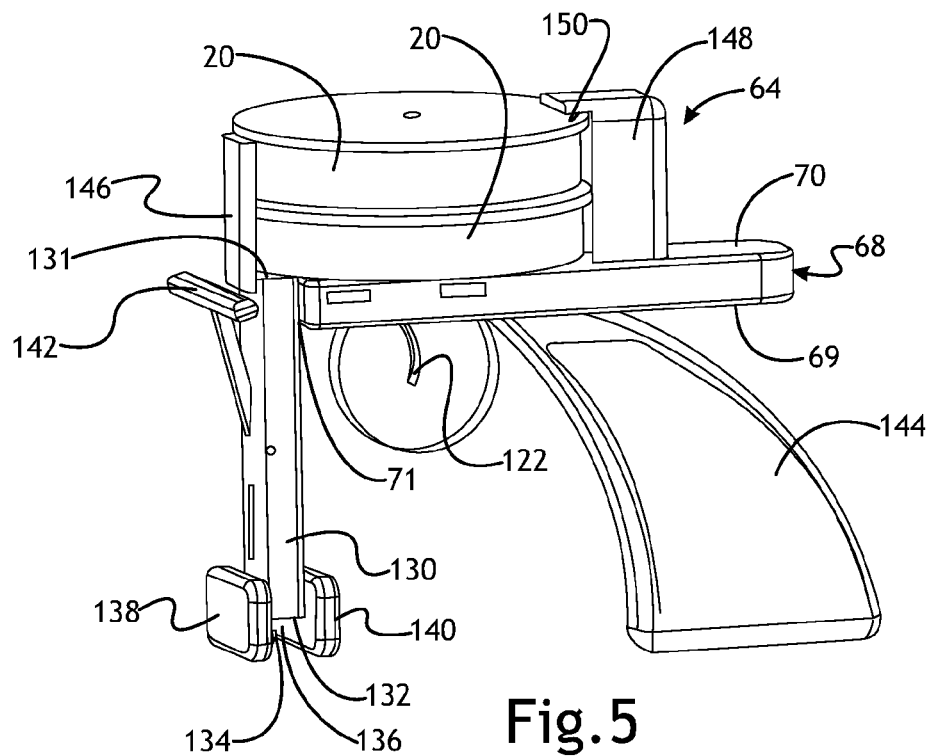
FIG. 5 illustrates a perspective view of a carrousel cartridge loading device according to a number of variations.
Figure 8:
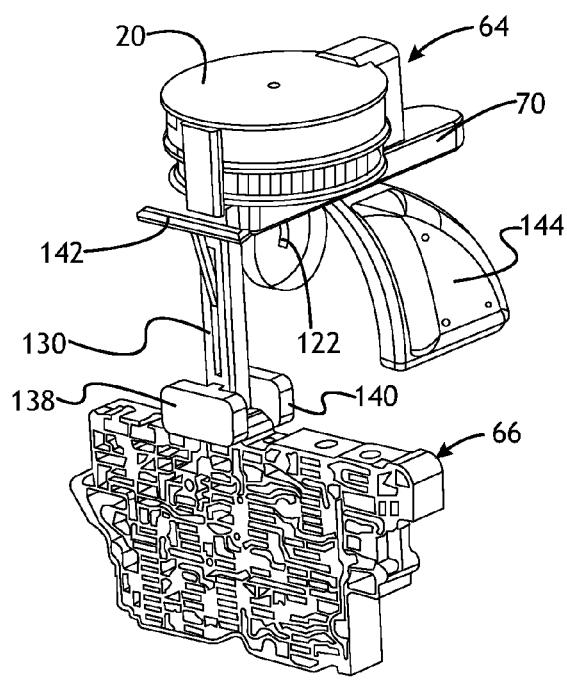
FIG. 8 illustrates a perspective view of a carrousel cartridge loading device attached to a valve body according to a number of variations.
Figure 9:
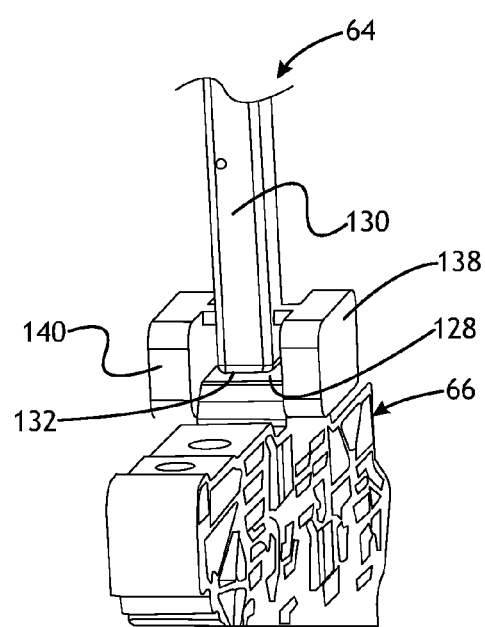
FIG. 9 illustrates a close-up perspective side view of a carrousel cartridge loading device attached to a valve body according to a number of variations.

In a number of variations, a barrel 130 may be located adjacent the front end 71 of the indexing cam housing 70 and may be constructed and arranged to receive at least a portion of the trap door slide 74. The barrel 130 may be any number of shapes including, but not limited to cylindrical or rectangular, variations of which are illustrated in FIGS. 5 and 6. The barrel 130 may be constructed and arranged to accommodate and direct one or more components 58 out of the carrousel cartridge 20. The barrel 130 may be hollow and may include a bottom surface 132. The bottom surface 132 may include an opening 134 which may be constructed and arranged to allow the release of one or more components 58 from the carrousel cartridge 20. The opening 134 may include a lip 136 which may be constructed and arranged to mate with a vehicle component including, but not limited to, a hole 128 on the valve body 66, a variation of which is illustrated in FIG. 9, which may assist in assembly of a vehicle system. The barrel 130 may also include one or more guides 138, 140 which may assist an operator in assembly of a vehicle system by assisting the operator in the lining up of components 58. In one variation, the guides 138, 140 may be constructed and arranged so that the vehicle component including, but not limited to, the valve body 66, may fit in between the first and the second guide 138, 140, variations of which are illustrated in FIGS. 8 and 9.

In a number of variations, the barrel 130 may also include a lever device 142, a variation of which is illustrated in FIGS. 5 and 6, which may be constructed and arranged so that it may be pulled downward to increase compression on a component 58 during assembly. In another variation, the lever device 142 may also be used by an operator to compress any number of components which an operator may manually insert after the one or more components 58 from the carrousel cartridge 20 are dropped through gravity into place in the vehicle component including, but not limited to, a retaining clip which may be used to secure the components 58 in the valve body 66.

In a number of variations, a handle 144 may be attached to the indexing cam housing 70. In one variation, the handle 144 may be attached to the bottom surface 69 of the indexing cam housing 70, variations of which are illustrated in FIGS. 5 and 6. In another variation, the handle 144 may be attached to a rear surface of the indexing cam housing 70, not illustrated. Any number of handle 144 configurations may be used.

In a number of variations, one or more carrousel cartridge holders 146, 148 may be attached to the cam indexing housing 70 and/or the barrel 130 to hold one or more carrousel cartridges 20 in place. In one variation, a first holder 146 may be attached to the barrel 130 adjacent the top end 131 of the barrel 130 and may be substantially planar, a variation of which is illustrated in FIG. 5. In another variation, the first holder may be curved or rounded to contour the shape of the carrousel cartridge 20, (not illustrated). A second holder 148 may be attached to the indexing cam housing 70 and may include a cutout or groove 150 which may be constructed and arranged to accommodate at least a portion of one or more carrousel cartridges 20 including, but not limited to, the protrusion 42 and the tab 28 on the one or more carrousel cartridges 20, a variation of which is also illustrated in FIG. 5. In a number of variations, one or more carrousel cartridges 20 may be inserted between the one or more carrousel cartridge holders 146, 148 above the indexing cam housing 70 so that the openings 23, 40 in the top compartment 22 and the bottom compartment 30 line up with the top end 131 of the barrel 130.

In a number of variations, each carrousel cartridge 20 may contain a different set of components 58. The carrousel cartridges 20 may be color coated or marked to indicate which set of components 58 are contained inside. In one variation, the carrousel cartridges 20 may be used for the shipping/or assembly of transmission valve body springs, valves, and cap components. The loading device 64 may then be used to assemble one or more of the parts into predetermine body hole(s) 128 in a transmission valve body 66 with limited operator interaction. The carrousel cartridges 20 and loading device 64 may provide improved ergonomics for operators as the operators may no longer have to pick individual components from boxes with limited finger clearance. The carrousel cartridges 20 and loading device 64 may also allow for synchronous indexing/dispensing of components into a single installation point rather than assembly of individual parts. The carrousel cartridges 20 may also reduce the incidence of operators dropping components 58 which may damage the components 58 or expose the components 58 to contaminants by eliminating or reducing operator interaction with the components 58. The carrousel cartridges 20 may also improve cycle times which may be reduced due to dropped and/or fumbled parts. The carrousel cartridges 20 and loading device 64 may also provide proper orientation of the components 58 which may eliminate the need for pre-assembly kitting of components 58.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a carrousel cartridge loading device comprising: an indexing cam system; a spring-loaded trigger, wherein the spring-loaded trigger is attached to the indexing cam system; a handle, wherein the handle is attached to the indexing cam system; a barrel, wherein the barrel is operatively connected to the indexing cam system; and at least one carrousel cartridge holder, wherein the at least one carrousel cartridge holder is attached to the indexing cam system.

Variation 2 may include a product as set forth in Variation 1 wherein the carrousel cartridge loading device is constructed and arranged to release at least one component from a carrousel cartridge when activated.

Variation 3 may include a product as set forth in any of Variations 1-2 wherein the carrousel cartridge loading device is activated by the spring-loaded trigger.

Variation 4 may include a product as set forth in any of Variations 1-3 wherein the barrel is constructed and arranged to direct at least one component from at least one carrousel cartridge into an assembly.

Variation 5 may include a product as set forth in any of Variations 1-4 wherein the barrel includes one or more assembly guides.

Variation 6 may include a product as set forth in any of Variations 1-5 wherein the barrel further comprises a lever device constructed and arranged to compress the at least one component during assembly.

Variation 7 may include a product as set forth in any of Variations 1-6 wherein the cam indexing system comprises: a housing; a trap door, wherein the trap door is slideably disposed within the housing; a cam, wherein the cam is operatively connected to the trap door; and a shaft, wherein the shaft is operatively coupled to the cam.

Variation 8 may include a product as set forth in Variation 7 wherein the shaft further comprises at least one paddle device.

Variation 9 may include a product as set forth in any of Variations 7-8 wherein the trap door includes a protrusion which is constructed and arranged to mate with at least one notch on the cam to lock the cam in place when the spring-loaded trigger is in a first position.

Variation 10 may include a product as set forth in any of Variations 7-9 wherein the spring-loaded trigger is attached to the trap door; and wherein when the spring-loaded trigger is pulled, the trap door moves from a first position to a second position exposing an opening in the housing in line with the barrel and wherein the cam rotates causing the shaft to rotate.

Variation 11 may include a product as set forth in any of Variations 4-10 wherein the at least one component is at least one of a transmission valve body spring, a valve, or a cap component and the assembly is a transmission valve body.

Variation 12 may include a product as set forth in any of Variations 1-11 wherein the carrousel cartridge loading device is hand-held.

Variation 13 may include a product as set forth in any of Variations 1-12 wherein the at least one carrousel cartridge holder is constructed and arranged to hold at least one carrousel cartridge.

Variation 14 may include a product as set forth in any of Variations 1-13 further comprising at least one carrousel cartridge operatively connected to the carrousel cartridge loading device.

Variation 15 may include a product as set forth in any of Variations 1-14 wherein the at least one carrousel cartridge comprises a bottom compartment; an inner case, wherein the inner case is rotatably attached to the bottom compartment and is constructed and arranged to accommodate at least one component; and a top compartment, wherein the top compartment and the bottom compartment are slideably attached together.

Variation 16 may include a method comprising: shipping and assembly of vehicle components comprising: providing at least one carrousel cartridge to hold at least one component; placing the at least one component into the at least one carrousel cartridge and closing the at least one carrousel cartridge sealing the at least one component inside; placing the at least one carrousel cartridge into a carrousel cartridge loading device; lining up the carrousel cartridge loading device with a vehicle assembly; and activating the carrousel cartridge loading device to drop the at least one component onto a vehicle assembly.

Variation 17 may include a method as set forth in Variation 16 wherein the at least one component includes at least one of a transmission valve body spring, a valve, or a cap component and wherein the vehicle assembly comprises a transmission valve body.

Variation 18 may include a method as set forth in any of Variations 16-17 wherein the at least one carrousel cartridge comprises a bottom compartment; an inner case, wherein the inner case is rotatably attached to the bottom compartment and is constructed and arranged to accommodate at least one component; and a top compartment, wherein the top compartment and the bottom compartment are slideably attached together.

Variation 19 may include a method as set forth in any of Variations 16-18 wherein the carrousel cartridge loading device comprises an indexing cam system; a spring-loaded trigger, wherein the spring-loaded trigger is attached to the indexing cam system; a handle, wherein the handle is attached to the indexing cam system; a barrel, wherein the barrel is operatively connected to the indexing cam system; and at least one carrousel cartridge holder, wherein the at least one carrousel cartridge holder is attached to the indexing cam system.

Variation 20 may include a method as set forth in any of Variations 16-19 wherein the carrousel cartridge loading device is hand held, and wherein the carrousel cartridge loading device is activated by the spring-loaded trigger.

The above description of select variations within the scope of the invention is merely illustrative in nature and, thus, variations or variants thereof are not to be regarded as a departure from the spirit and scope of the invention.

What is claimed is:

1. A product comprising:
 a carrousel cartridge loading device comprising:
 an indexing cam system, wherein the indexing cam system comprises: a housing; a trap door, wherein the trap door is slideably disposed within the housing; a cam, wherein the cam is operatively connected to the trap door; and a shaft, wherein the shaft is operatively coupled to the cam;
 a handle, wherein the handle is attached to the indexing cam system;
 a barrel, wherein the barrel is operatively connected to the indexing cam system;
 a spring-loaded trigger, wherein the spring-loaded trigger is attached to the indexing cam system and is attached to the trap door; and wherein when the spring-loaded trigger is pulled, the trap door moves from a first position to a second position exposing an opening in the housing in line with the barrel and wherein the cam rotates causing the shaft to rotate; and
 at least one carrousel cartridge holder, wherein the at least one carrousel cartridge holder is attached to the indexing cam system.

2. The product of claim 1 wherein the carrousel cartridge loading device is constructed and arranged to release at least one component from a carrousel cartridge when activated.

3. The product of claim 2 wherein the carrousel cartridge loading device is activated by the spring-loaded trigger.

4. The product of claim 1 further comprising at least one carrousel cartridge operatively connected to the carrousel cartridge loading device.

5. The product of claim 4 wherein the at least one carrousel cartridge comprises a bottom compartment; an inner case, wherein the inner case is rotatably attached to the bottom compartment and is constructed and arranged to accommodate at least one component; and a top compartment, wherein the top compartment and the bottom compartment are slideably attached together.

6. The product of claim 1 wherein the barrel is constructed and arranged to direct at least one component from at least one carrousel cartridge into an assembly.

7. The product of claim 1 wherein the barrel includes one or more assembly guides.

8. The product of claim 1 wherein the barrel further comprises a lever device constructed and arranged to compress at least one component during assembly.

9. The product of claim 1 wherein the shaft further comprises at least one paddle device.

10. The product of claim 1 wherein the trap door includes a protrusion which is constructed and arranged to mate with at least one notch on the cam to lock the cam in place when the spring-loaded trigger is in the first position.

11. The product of claim 1 wherein the carrousel cartridge loading device is hand-held.

12. The product of claim 1 wherein the at least one carrousel cartridge holder is constructed and arranged to hold at least one carrousel cartridge.

\* \* \* \* \*